United States Patent [19]

Yamamori et al.

[11] 4,366,724

[45] Jan. 4, 1983

[54] TRANSVERSE AXLE AUTOMATIC TRANSMISSION

[75] Inventors: Takahiro Yamamori, Tokyo; Kazuyoshi Iwanaga; Kunio Ohtsuka, both of Yokohama, all of Japan

[73] Assignee: Nissan Motor Co., Ltd., Yokohama, Japan

[21] Appl. No.: 155,258

[22] Filed: Jun. 2, 1980

[30] Foreign Application Priority Data

Jun. 4, 1979 [JP] Japan ................................ 54-69673

[51] Int. Cl.³ ..................... F16H 57/04; F16H 37/08
[52] U.S. Cl. ........................................ 74/467; 74/701
[58] Field of Search ................................ 74/701, 467

[56] References Cited

U.S. PATENT DOCUMENTS 2,743,627  5/1956  Christenson .
3,722,321  3/1973  Walker et al. ................... 74/606 R

FOREIGN PATENT DOCUMENTS 2127825  3/1972  Fed. Rep. of Germany .
2839886  5/1979  Fed. Rep. of Germany .
54-52265  4/1979  Japan ................................... 74/467
500598   2/1939  United Kingdom .
810411   3/1959  United Kingdom .
1344728  1/1974  United Kingdom .
2019962 11/1979  United Kingdom .

*Primary Examiner*—Allan D. Herrmann
*Attorney, Agent, or Firm*—Thompson, Birch, Gauthier & Samuels

[57] ABSTRACT

The present invention concerns an automatic transaxle wherein connecting passages between an oil pan and a final gear chamber are arranged at a higher level, being formed in the bottom portion of a transmission chamber wall above the oil pan. The transmission chamber also communicates with the final gear chamber. Oil flows between the final gear chamber and oil pan only through the connecting passages so that the oil level in the oil pan will not drop below the level of an oil intake port.

2 Claims, 3 Drawing Figures

TRANSVERSE AXLE AUTOMATIC TRANSMISSION

BACKGROUND OF THE INVENTION

The present invention relates to a transverse axle automatic transmission and more particularly to an improvement in the lubrication system of the various gear mechanisms of a transverse axle automatic transmission.

Transverse axle automatic transmissions combining integrally therewith the drive wheel differential and gear assembly are commonly termed "automatic transaxles"; therefore, that term will be used in the following description. In this type of transmission, the transmission chamber and final gear chamber are disposed adjacent each other, the transmission oil pan being positioned below the transmission chamber. The final gear chamber should store oil for lubricating the final gear assembly and the oil pan should store oil for lubricating the change-speed control mechanism and those portions of the power train within the transmission chamber requiring lubrication. A ring gear splashes oil from the final gear chamber upwards for lubricating the final gear assembly, while the oil pump withdraws oil from the oil pan via an oil intake port for lubricating the automatic change-speed control mechanism and the power train.

Automatic transaxles having the final gear chamber separated and independent of the oil pan are limited to full sized vehicles, due to the increased overall length inherent in this particular construction. For this reason, it is preferrable that the final gear chamber communicates with the oil pan so that common oil is used for lubricating the final gear assembly and for actuating and lubricating the automatic change-speed control mechanism and the power train.

Therefore, prior art devices have incorporated a connecting passage between the oil pan and final gear chamber. This passage is positioned as low as possible to most effectively permit transmission oil to freely flow therebetween. With this arrangement, if the oil level within the final gear chamber increases, an increased amount of oil is returned to the oil pan; an increase in oil level within the oil pan causes an increase in the amount of oil to flow through the connecting passage from the oil pan to the final gear chamber, causing an increase in the oil within the final gear chamber. Repeating this cycle results in a balanced in oil level in the final gear chamber and the oil pan. The initial objective is accomplished accordingly.

However, with the transaxle case of this construction, an excessive amount of oil in the oil pan will flow via said connecting passage into the final gear chamber, causing an oil shortage in the oil pan. This shortage is most serious when the level dips below the intake port, as when vehicle motion shifts and inclines the oil level therein. When this occurs, the oil pump sucks air rather than oil, causing a reduction in line pressure of the automatic change-speed control mechanism, causing such inconveniences as, excessive wear of the frictional elements, insufficient lubrication of the power train and racing of the engine, not to mention loss of power to the drive wheels.

In order to solve this problem, a baffle plate is positioned opposite the oil pan connecting port to minimize the effect of oil shifting. However, this measure is effective only against oil level shifts of a short time duration, therefore practically totally ineffective.

SUMMARY OF THE INVENTION

The present invention provides an automatic transaxle wherein the connecting passage between the oil pan and final gear chamber is arranged at a higher level, being formed in the bottom portion of the transmission chamber wall above the oil pan. The transmission chamber also communicates with the final gear chamber. In the present invention, oil flows between the final gear chamber and oil pan only through the connecting passage so that the oil level in the oil pan will not drop below the level of the intake port under any vehicle running conditions.

BRIEF DESCRIPTION OF THE DRAWINGS

The present invention will be further described hereinafter in connection with the accompanying drawings, wherein.

DETAILED DESCRIPTION OF THE INVENTION

Figure 1:
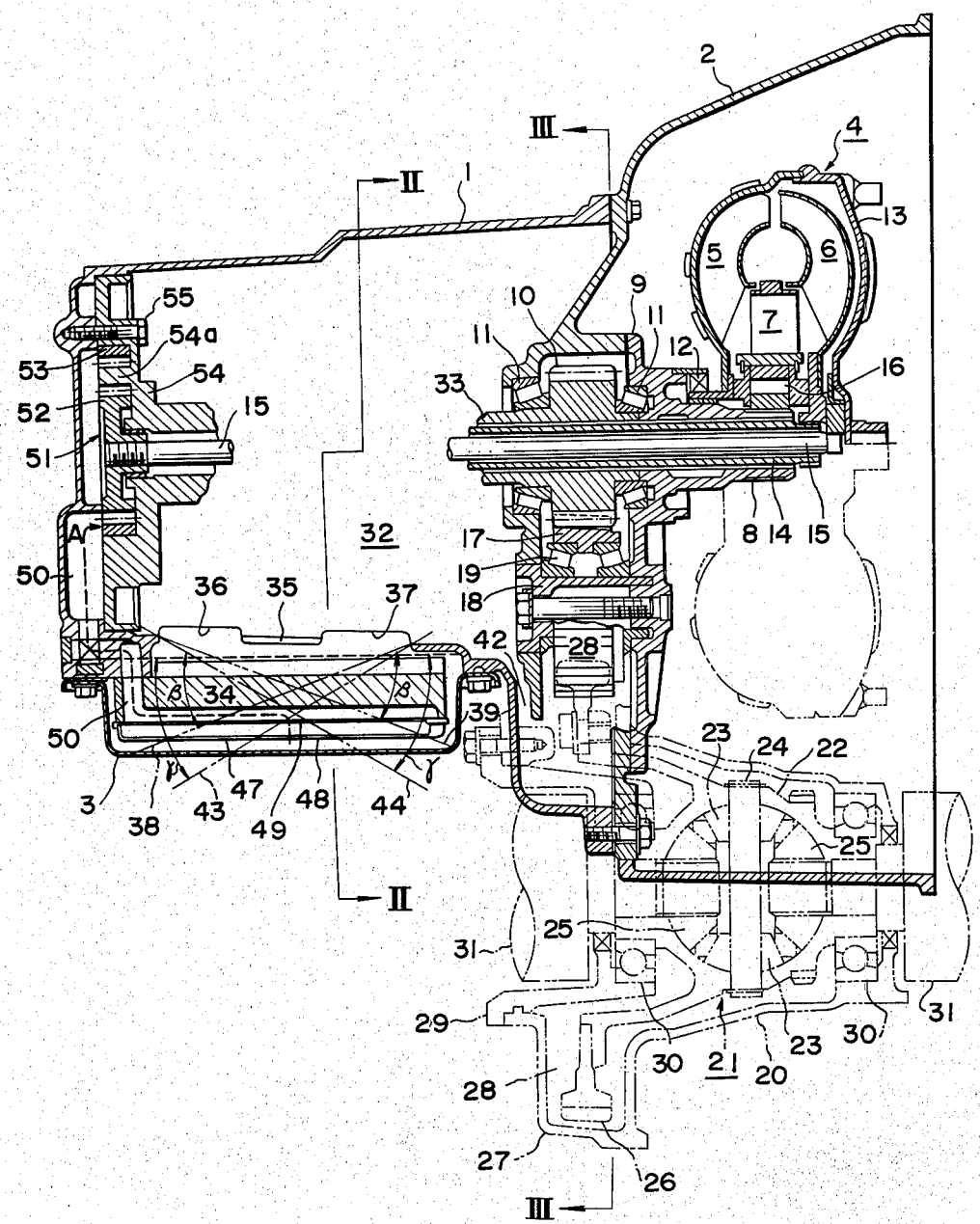
FIG. 1 is a longitudinal section of an automatic transaxle employing a transaxle case according to the present invention.
Figure 2:
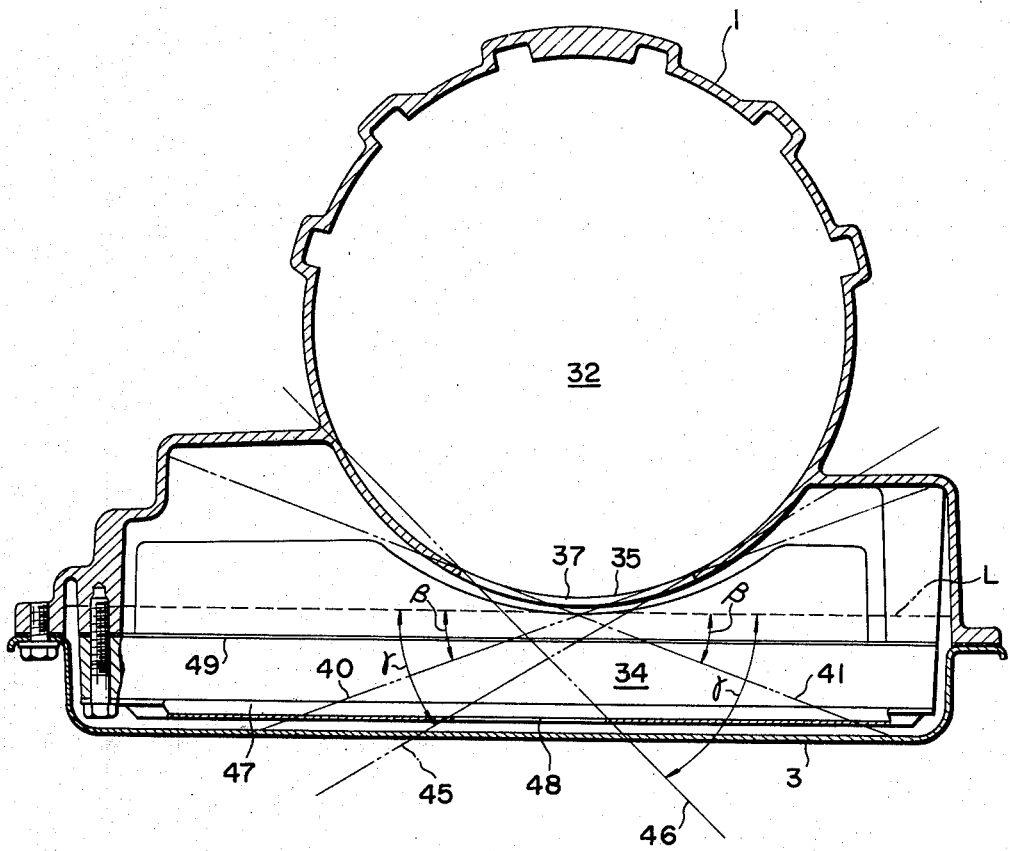
FIG. 2 is a section taken through line II—II of FIG. 1.
Figure 3:
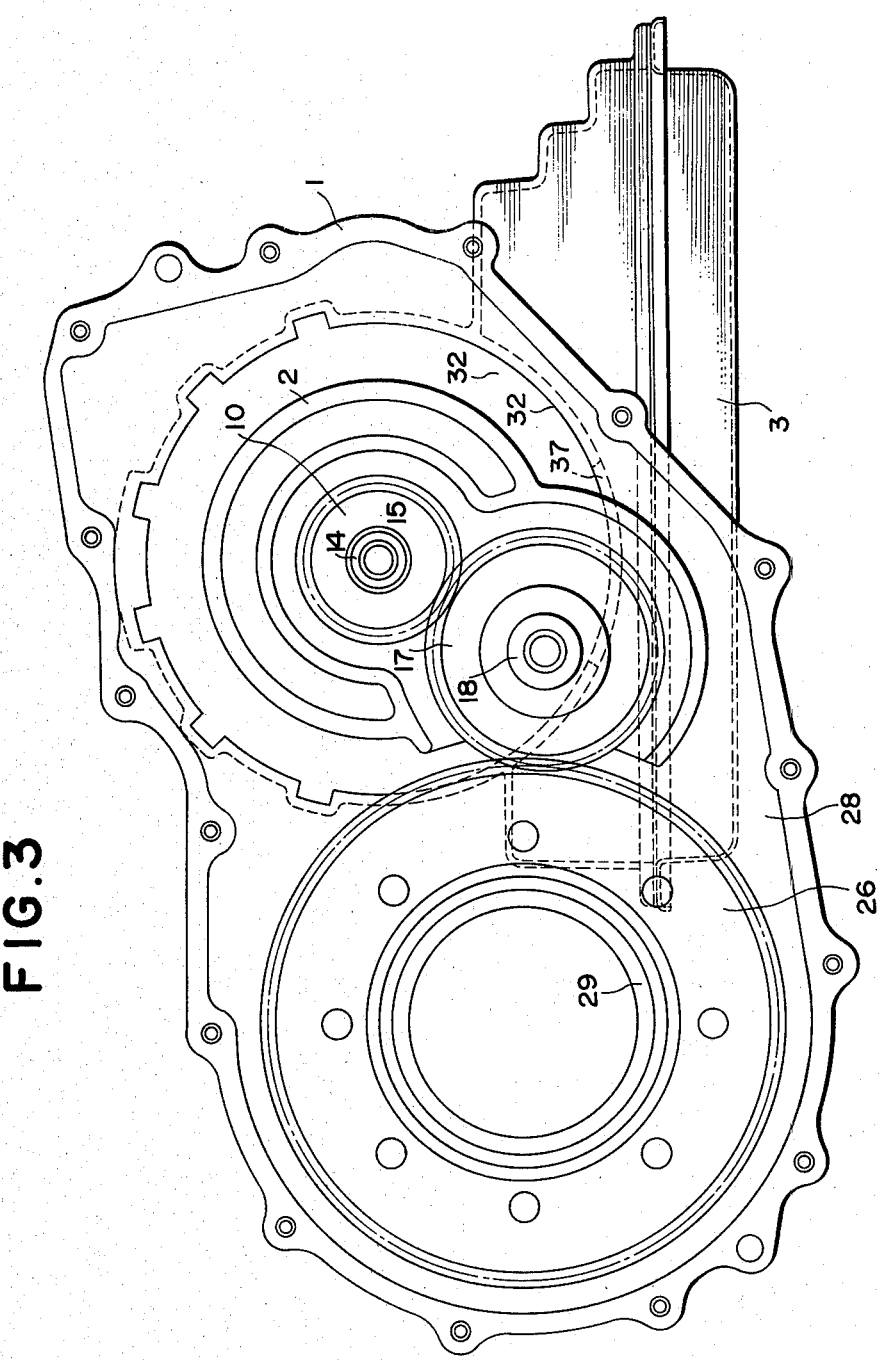
FIG. 3 is a section taken through line III—III of FIG. 1.

Referring to FIGS. 1 and 2, there is shown a preferred embodiment of the transaxle of the present invention. A final drive portion is shown in phantom. FIG. 1 is a sectional view taken through the transmission drive shaft 15 and and stationary shaft 18. Also shown are a converter housing 2 and an oil pan 3. Accommodated by the converter housing 2 is a torque converter 4 which, as usual, comprises a pump impeller 5, a turbine runner 6 and a stator 7. Fixedly secured to the converter housing 2 is a gear cover 9 having a hollow stationary shaft 8 integrally formed therewith. Between the gear cover 9 and the converter housing 2 an output gear 10 is disposed, rotatably supported by a bearing 11. Rotatably supported by the hollow stationary shaft 8 by a bushing 12 is a pump impeller 5 which is driven by an engine via a converter cover 13.

Rotatably extending through the hollow stationary shaft 8 and the output gear 10 is an input shaft 14. This input shaft 14 includes a concentric bore to receive a pump drive shaft 15 therethrough. The turbine runner 6 is splined to the input shaft 14 and the stator 7 is connected to the hollow stationary shaft 8 via a one-way clutch 16. A converter cover 13 driven by the engine is connected to the pump drive shaft 15 to drive an oil pump 51. The oil pump 51 is disposed within an oil pump housing 54 that is fixed to the transaxle case 1 by bolts 55. It comprises an inner gear 52 splined to the pump drive shaft 15, an outer gear 53 meshing with the inner gear 52, its rotational axis being offset with respect thereto, and a crescent portion 54a which projects into a space between the gears 52 and 53 from the oil pump housing 54. Also disposed between the gear cover 9 and the converter housing 2 is an idler gear 17 which is rotatably supported by a stationary shaft 18 and bearings 19 so as to mesh with the output gear 10. Integrally formed with the converter housing 2 is a final drive case 20 having a differential gear 21 therein. The differential gear 21 comprises a differential case 22, pinion mate gears 23, a pinion mate shaft 24, and a side gear 25. A ring gear 26 is fixedly connected to the differential case 22. The ring gear 26 meshes with the idler gear 17, and these gears and the output gear 10 form a final gear train. The final drive case 20 and the ring gear case 27 integrally formed with the transaxle case 1 define a final gear chamber 28.

The final drive case 20 and the differential gear cover 29 include bearings 30 that rotatably support the differential case 22. Axle shafts 31 are splined to a pair of side gears 25, respectively. Each axle shaft 31 drives a vehicle wheel.

As shown in FIG. 2, the transaxle case 1 comprises a cylindrical portion which defines a transmission chamber 32. This transmission chamber 32 houses a shaft portion 33 of the output gear 10, the input shaft 14 and the transmission mechanism. Attached to the lower portion of the transaxle case 1 is the oil pan 3 which accommodates therein a valve body 34 of the automatic change-speed control mechanism, and an oil strainer cover 47, attached to the lower portion of the valve body 34, and formed with an oil intake port 48. The oil pan 3 is open to the cylindrical portion 35 of the transmission chamber 32. Between the valve body 34 and the oil strainer cover 47, an oil strainer 49 is disposed, formed of a wire netting or the like.

The oil pan 3 and the oil pump 51 are connected through an oil conduit 50. The lower portion of the transmission case 35 is formed with connecting passages 36 and 37 providing communication between the transmission chamber 32 and the oil pan 3. Preferably, the connecting passages 36 and 37 are elongate, extending circumferentially around the case 35. The arrangement and size of the connecting passages 36 and 37 are appropriately selected, as will be explained later, so that even if the oil level in the oil pan 3 takes any one of the oil levels indicated by phantom lines 38–46, the oil level still remains higher than the oil intake port 48. An oil level when the vehicle is horizontal is indicated at L as shown in FIG. 2.

The transaxle case 1 and converter housing 2 cooperate to form an opening 42. Thus, communication between the oil pan 3 and the final gear chamber 28 is via the connecting passages 36 and 37, the transmission chamber 32, and the opening 42.

With the above-mentioned construction, engine rotation is transmitted to the pump impeller 5 via the converter cover 13, through the transmission to the oil pump 51. The oil pump 51 withdraws oil from the oil pan 3 via the oil intake port 48, the oil strainer 49 and the oil conduit 50. Rotation of the turbine runner 6 is transmitted through the power train in the transmission chamber 32 to the output gear 10. The output gear 10 drives the idler gear 17, the ring gear 26, and the differential gear 21 to drive the axle shafts 31.

When the vehicle is moving, the ring gear 26 splashes oil in the final gear chamber 28 upwardly, and into the transmission chamber 32 via the opening 42, thereafter returning to the oil pan 3 via the connecting passages 36 and 37. Since the connecting passages 36 and 37 are located considerably higher than the oil intake port 48, and since the only path of oil travel to and from the oil pan are via the intake port and the connecting passages, the intake port is submerged at all times, even under sustained unusual driving conditions as severe turns and inclines.

Various driving conditions cause the oil level in the oil pan 3 to incline as shown by phantom lines 38–46.

When the vehicle is making a turn, a centrifugal force causes the oil surface to incline, where the following equation holds. Assuming that F is the centrifugal force, W the weight of oil, g the acceleration of gravity; $\alpha$ the acceleration applied to the oil, $\beta$ the angle formed by the oil surface and the horizontal surface, and G the acceleration caused by the vehicle making a turn, then:

$$F = (W/g) \times \alpha \qquad (1)$$

$$F = W \times \tan \beta \qquad (2)$$

From (1) and (2), $$\beta = \tan^{-1} G \qquad (3)$$

(where $G = (a/g)$)

Ordinarily the maximum acceleration when the vehicle is making a turn is approximately 0.35 g. Therefore, the angle of inclination $\beta$ of the oil surface in the lateral direction (left and right in FIG. 1) of the vehicle becomes approximately 20°.

Also, since the maximum gradient in the case of ordinary roads is approximately 20° (tan $\theta = 0.36$), the oil surface inclination angle $\beta$ in the longitudinal direction (right and left direction in FIG. 2) is approximately 20° at the maximum. Therefore, arranging the sizes and locations of the connecting passages 36 and 37 and the oil intake port 48 so that the minimum angle from horizontal defined by a line (43 and 44 in FIG. 1; 45 and 46 in FIG. 2) connecting the opposite outer edges of the connecting passages and the intake port is greater than 20° will insure that the intake port is submerged under all driving conditions tending to incline the oil surface.

When the vehicle is accelerating or decelerating, such acceleration is relatively small and thus the oil surface inclination angle $\beta$ is small, so that the relative positioning of the connecting passages and oil intake port outlined hereinabove is suitable to accomplish the objectives of the present invention. Under deceleration upon rapid braking, the oil surface inclination angle $\beta$ may increase to 22° to 35° however, this causes no problem because under such deceleration, the wheels lock and such deceleration is only temporary.

For the reasons discussed above, the connecting passages 36 and 37 are arranged and formed in the transaxle case 1 such that the angle formed by the horizontal plane and the lines 38 to 46 leading from the opposite edges of the connecting passages 36 and 37 to the oil intake port 48 is larger than 20°. Therefore, the oil surface angle will not exceed that indicated at $\gamma$ in the drawings.

It will be appreciated from FIG. 1 of the drawings that oil in the substantially closed chamber defined by the oil pan 3 is allowed to enter the final gear chamber 28 only via the apertured wall portion 35, the gear chamber 32 and the opening 42.

It will now be understood that with the transaxle according to the present invention, an excessive overflow of oil from the oil pan to the final gear chamber 28, which could lower the oil level to permit exposure of the oil intake port, is prevented over various running conditions of the vehicle. Thus slipping of the friction elements caused by a reduction in line pressure in the automatic change speed mechanism is eliminated.

What is claimed is:

1. A transaxle comprising:

a transaxle case including a first portion defining a transmission chamber and a second portion defining a final gear chamber;

means cooperating with said transaxle case for defining an opening providing an oil flow path between said transmission chamber and said final gear chamber; and an oil pan attached to said transaxle case to form a substantially closed oil chamber, said oil pan enclosing an oil intake port leading to an oil pump;

said first portion of said transaxle case including a wall portion defining a part of said substantially closed oil chamber, said wall portion having apertures which provide an oil flow path between said substantially closed oil chamber and said transmission chamber so that oil in said substantially closed oil chamber is allowed to enter said final gear chamber only via the apertures of said wall portion, said transmission chamber and said opening.

2. A transaxle as claimed in claim 1, wherein the apertures of said wall portion are connecting passages, said connecting passages and said oil intake port are arranged and located such that the minimum angle from horizontal defined by a line connecting the opposite outer edges of said connecting passages and said intake port is greater than 20° so as to insure that said intake port is submerged under all driving conditions of a vehicle to which the transaxle is adapted to be mounted, regardless of the inclination of the oil surface in said oil pan.

* * * * *